Dec. 13, 1960
W. W. WEBB ET AL
MANUFACTURE OF POROUS SHEET MATERIAL
FROM POWDERED POLYMERS
Filed March 18, 1958
2,963,746
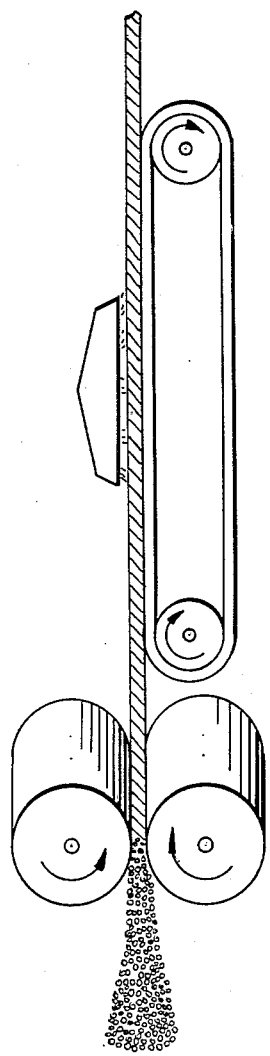
INVENTOR
WALTER WESTON WEBB
ALAN DUERDEN
BY Cushman, Darby and Cushman
ATTORNEYS

2,963,746
MANUFACTURE OF POROUS SHEET MATERIAL FROM POWDERED POLYMERS

Walter Weston Webb, Bramhall, and Alan Duerden, Hyde, England, assignors to Imperial Chemical Industries Limited, London, England, a corporation of Great Britain Filed Mar. 18, 1958, Ser. No. 722,133

Claims priority, application Great Britain Mar. 22, 1957

11 Claims. (Cl. 18—57)

This invention relates to the manufacture of sheets of polymeric material. It is concerned particularly with the production of sheets which are initially porous and which may be used in this state or, where desirable, may be further processed to produce non-porous sheet.

There have been a number of proposals for producing porous sheets of polymeric material. These processes can be divided into a number of classes—one method is simply to sinter a layer of powdered polymeric material by heating, another is to form a non-porous continuous sheet and to puncture this mechanically, yet another method is to form a sheet which has included in its composition a material which is itself porous, and still another method is to incorporate within the composition a material which is either soluble or can be rendered soluble and to leach out this latter material. Each of these methods has its disadvantages which may be, either singly or in combination, low inherent strength, low porosity, little control of porosity or a complicated process.

It is well known also to make self-supporting non-porous sheets of polymeric materials and this is normally done by calendering or extruding. There are several limitations and disadvantages attached to both these processes. Firstly, very hard polymers such as polyvinyl chloride usually require the addition of a plasticising material in order that the polymer may be more readily processed and, in addition, that it may be processed at a lower temperature than would otherwise be the case. Secondly, if no plasticising material is present in the polymer then special calendering equipment is required to deal with the polymer and a high temperature is required. Because of these high temperatures the polymer is apt to suffer degradation and even charring but, on the other hand, if in an attempt to avoid this possibility a temperature is used which is too low to render the polymer adequately plastic then cold marks and air streaks may show on the finished sheet.

Great difficulty is experienced in extruding hard polymers because the action of the extruder can lead to failures peculiar to this method of fabrication. For instance "dead spots" are likely to occur in the diehead so that instead of advancing through the machine the polymer may be held up in pockets, become charred and then contaminate the polymer which is flowing past it. Again because a fairly large mass of polymer is being handled at once it is difficult to ensure that all of it is brought to a uniform temperature and thoroughly mixed. Failure to achieve either of these ends results in defects such as unmixed particles of polymer.

This invention has the object of providing a new process for the production of porous polymeric sheets. There is also provided, as an extension of this first process, a novel means of making non-porous polymeric sheet materials. The invention may also be used to provide a process for the production of sheets of polymeric material which are particularly effective in the treatment of water and other fluids and as electrical storage battery separators.

The term "sheet" will be used hereinafter in both the specification and in the claims attached hereto to mean a range of thickness from about 0.001" upwards. Though it is not envisaged that porous sheet can be made below 0.008" with sufficient strength for practical purposes, certain non-porous sheets can be stretched to much thinner gauge.

According to the present invention there is provided a process for the manufacture of sheets of polymeric material which consists of two stages wherein in the first stage the polymer in powder form is compacted between rolls at a temperature low enough to form a continuous porous sheet while at the same time steps are taken to remove static electricity generated by the passage of the polymer through the rolls and wherein in the second stage the continuous porous sheet is heated to impart greater strength. The heating may be stopped at a point before the polymer particles fuse sufficiently to destroy the porosity of the sheet or it may be carried on until the polymer particles fuse together completely to give a non-porous sheet.

The single figure of the drawing shows schematically the carrying out of the above process.

In the practice of the present invention it is possible to incorporate an additional substance or substances for special purposes. For example, such substances may be used to treat fluids and in this case the sheet-making process may be stopped before the point where the sheet loses porosity when a porous sheet is necessary for the passage of the fluid through the sheet.

The invention may be put into practice by causing a polymeric substance in the form of a powder to pass through the nip between two rollers which exert considerable pressure on the polymer. At this stage the polymer is below its temperature of fusion and may be at room temperature or even lower. No steps are normally taken to heat the rolls as undue heat would tend to cause the polymer particles to become plastic and to fuse together prematurely thus tending to destroy porosity or causing a certain degree of extrusion which results in an uneven easily ruptured sheet. The rolls may become slightly heated by the work done on the polymer but this is not normally significant; if, however, it is desired the rolls can actually be cooled by passing water through them though this is a complication which we have found to be unnecessary. In certain circumstances some measure of heating may be desirable and this is acceptable as long as the above conditions are fully observed.

It has been found that a high charge of static electricity is generated by the passage of the polymer through the rolls which, if not removed, may damage the sheet as it leaves the rolls. If this static is continuously discharged the polymer is compacted into a brittle and friable but otherwise coherent sheet which is however too frail usually for practical purposes. The sheet is now transferred on a carrier through a hot zone. If the heat input to the sheet in its passage through the hot zone is sufficient only to fuse together the contiguous parts of the particles without causing the whole polymer to fuse—that is, to sinter it—the sheet will gain in strength, it will lose much of its brittleness and friability but it will largely retain the porosity it possessed as a compacted aggregate of particles. The heating may, however, be continued beyond this point and be sufficient to fuse all the polymer particles. It will then be found that there is formed a strong self-supporting sheet which may, at this point, or subsequently, be embossed or press polished. Stretching of the sheet may also be carried out both to reduce its thickness and to increase its tensile strength; the same purpose may be achieved by either hot or cold rolling.

Although our invention has been found to operate for a number of polymers it has been found also that there are a number of factors, each variable in itself and each affecting the others, which contribute to the success of the invention and to the nature of the product. These factors may be listed as:

(1) The softening point of the polymer.
(2) The particle size of the polymer.
(3) The particle shape of the polymer.
(4) The presence of lubricants.

These aspects are particularly important in the production of the porous sheet which of itself is an important product of the invention; they will be discussed separately for convenience but as they cannot in practice be isolated their interdependence will also be discussed later.

A combination of factors and characteristics must be taken into account both in the choice of polymers which will compact and in the processing to produce a given thickness and density of compact. The porous friable and brittle compact obtained before heating will be referred to hereinafter as "green compact." To produce a satisfactory green compact the polymer must be thermoplastic (i.e. thermoplastic at the time of processing, though as in the case of certain polymers such as urea formaldehyde, it may finally become thermoset). The particle size and distribution of particle size will influence porosity for any given polymer. Similarly, particle shape may also be important for certain polymers and the presence of lubricants is important.

As it will be understood that the process of compaction involves the squeezing of individual particles into intimate contact it will also be realised that those particle shapes which best lend themselves to close packing and interlocking are also those which best permit compaction. Spheres and cenosphers have been found to be virtually useless for this process whereas jagged irregular shapes are ideal for the purpose.

The softening point is particularly important for some polymers, for example polyvinyl chloride and its co-polymers with polyvinyl acetate and polyvinylidene chloride because with these polymers a high softening point polymer will be found by itself to be difficult if not impossible to compact. This is probably because the work done upon the polymer particles in passing through the compacting rolls generates only a small amount of heat and if the softening point of the polymer is too high there is insufficient heat to soften the boundaries of the particles to allow them to adhere together. On the other hand, however, if the softening point is very low the heat generated will tend to soften the particles too much and a non-uniform partly porous partly solid sheet will result.

Although the foregoing is correct for a single polymer in isolation it is possible, however, to achieve success with polymers at both ends of the softening point scale by a suitable blending of the polymers which will result in the same effect as if the polymer had of itself the required characteristics and it is not therefore possible to set precise limits to the upper and lower softening points of the main polymer ingredients. This will be discussed in greater detail below.

Polythene and polystyrene are found to be completely unsuitable for our process as no green compact can be formed. These polymers are difficult to obtain in a finely divided state, and even in the coarse state a green compact cannot be obtained because a non-porous sheet is formed when the material is passed through the rolls.

The various forms of polymethyl methacrylate granules are all relatively coarse spherical shaped particles and will not form a green compact or even a non-porous sheet but simply pass through the rolls unchanged.

On the other hand a green compact can be obtained with the irregular shaped particles of polymethyl methacrylate obtained by grinding either fully polymerised methyl methacrylate which has been cast in sheet form—such as is sold under the trade-name of "Perspex"—or methyl methacrylate moulding powder. The success or failure of compacting is due to the particle shape of the polymer.

Urea formaldehyde, phenol formaldehyde and melamine resins and their mixtures with wood flour, paper and so on can be used to provide a good green compact. These compacts must be made when their resins are in the thermoplastic state before thermosetting has taken place. The green compact thus obtained is useless for practical purposes and must be heated until it is thermoset. This heating would normally be carried out in a conventional press. These resins before compaction have irregular shaped particles which have an intermediate range of softening.

Polyvinyl chloride and its co-polymers with polyvinyl acetate and polyvinylidene chloride are particularly desirable polymers for the purposes of our invention, and these will now be discussed in some detail since they best illustrate the interdependence of the various factors already mentioned. References to "polymer" in the following paragraphs refer to these materials.

The first point of importance is that these polymers are manufactured in fine powder form with a particle size which ranges from relatively coarse to exceedingly fine.

It is found that too great a particle size will tend to prevent compaction. The size of particle, when other characteristics and conditions remain constant, will determine the porosity of the sheet. There is virtually no lower limit to the particle size except the two practical ones of the mechanical difficulty of getting lower than a certain particle size or of producing sheet that is too dense and consequently insufficiently porous to be of any real value or too thin to be handled. We have been unable to compact polymers with a surface area measurement of less than 600 sq. cm./gm. as determined by the air permeability method discussed by Rigten in Journal of the Society of Chemical Industry, 1943, vol. 62, p. 1, but have succeeded with polymers with 8,000 sq. cm./gm.

Lubrication is found to be deleterious to the process of compaction. For the purposes of our invention, lubricants can be considered as any substances which tend to keep the particles of polymer separated from one another during compaction. An external lubricant, for our purposes, is one that is added to the powder before compaction as part of the composition; such an external lubricant is calcium stearate and the presence of this material completely prevents compaction. Internal lubricants are those which are already contained within the polymer and they may prevent the production of green compact or, at best, render it more difficult. This latter point is now discussed.

Polyvinyl chloride and its co-polymers with polyvinyl acetate and polyvinylidene chloride may be manufactured in a variety of ways which may be generally classified as homogeneous or heterogeneous polymerisation systems.

In homogeneous systems the monomer or monomers are caused to polymerise usually with the aid of polymerisation catalyst either without diluent or in the presence of an organic diluent which is miscible with the monomers but is usually (but not necessarily) a nonsolvent for the polymer. The polymer which precipitates from the polymerisation system or which is precipitated from it by the addition of non-solvent after polymerisation is completed is obtained in very pure form and the particles are usually fine and irregularly shaped agglomerates. It is believed that a polyvinyl chloride with a 15% co-polymer of polyvinyl acetate sold under the registered trade name of "Vinylite" VYHH is made by this process (the so-called "solution" process). This material which has a surface area of about 900 sq. cm./gm. and a Fikentscher K value of about 46 produced an excellent strong green compact. The ease of compaction is believed to be due to a large extent to the absence of polymerisation residues which would tend to act as lubricants.

In heterogeneous polymerisation systems the monomeric substances are generally dispersed in water to aid in the dispersion of heat and to produce material in the desired physical form. Such systems are divided into two main classes: in the case of granular or suspension polymerisation the monomers have dissolved in them a catalyst and are dispersed in water containing a protective colloid such as gelatine or polyvinyl alcohol. The polymer is usually obtained from this process by filtration so that it can be washed to remove certain of its impurities before drying. A polymer made by this granular process but otherwise similar in characteristics to the solution-type polymer discussed above was found to give a reasonable green compact but not of such good quality as the "Vinylite" VYHH. An example of this type of granular polymer is that sold under the registered trade name of "Corvic" R46/82. Granular polymers of PVC alone compacted less well than the co-polymers though in some cases an adequate green compact was achieved—notably with that sold under the registered trade name of "Corvic" D65/6.

In the other heterogeneous system of polymerisation, known as emulsion polymerisation, a water soluble catalyst such as ammonium persulphate is used along with an emulsifying agent. In this case, the polymer is usually separated from the latex by spray drying. While the products of granular polymerisation are generally solid particles of more or less irregular shape those obtained by the spray drying of latex are usually hollow spheres (cenospheres) or broken portions thereof and contain all the polymerisation ingredients such as catalyst residues, emulsifying agent and so on. In the main, we have been unsuccessful in making green compact with this emulsion-type polymer by itself and this we attribute to the presence of these residual substances and particularly to the emulsifying agent which is quite frequently a highly lubricant material. When we have succeeded in producing green compacts with this type of polymer, for example that sold as "Corvic" LH, the compact has been much thinner and weaker than with the other types.

The effects of both a high softening point and the residues of the polymerisation process can be overcome to some extent, particularly in the case of polyvinyl chloride polymers by themselves, by the addition of co-polymers. These have a much lower softening point than the straight polymer and so by the choice of the correct proportion of co-polymer—usually polyvinyl chloride/acetate—a balance can be achieved which permits the compacting of a polymer which would otherwise be difficult or impossible. Similarly, a very high softening point polymer can be added to one with a softening point which, by itself, would be too low for compaction to give a mixture which can be processed satisfactorily.

It will readily be understood that plasticisers which are so necessary for almost all the conventional methods of fabricating PVC cannot in general be used in our process because these plasticisers if present at all lubricate the powder and thus destroy any possibility of compacting the mixture.

Functional additives to PVC polymers should be chosen with a view to the requirements of compaction. Stabilisers with no lubricant properties should be chosen; for example white lead in dry dispersion can be used but calcium stearate can not. Limited quantities of pigments can be used and fillers such as are used in conventional compositions, for example bentonite and wood flour, can be used but compaction is impaired if large amounts are present.

A novel secondary feature of our invention has been found to lie in the fact that certain additives with particular properties can be included in the polymer composition for compaction. The green compact can be made to yield finally a strong porous sheet of polymeric material which is resistant to acid, alkalis and many other substances and which therefore lends itself particularly to the function of a diaphragm for the treatment of fluids, for instance in filtration or purification. In addition we have found that such diaphragms are ideal for use as electrical storage battery separators and this application will be discussed in a later part of this specification.

It has been found also that materials such as anionic and cationic ion exchange materials can be included in the powder mix for subsequent compaction. Examples of such materials are sodium aluminium silicate such as is sold under the registered trade name of "Doucil," sulphonated coal such as is sold under the registered trade name of "Suncol" and the ion exchange resins sold under the registered trade name of "Amberlite" CG120 and CG400. Other compatible materials for the treatment of fluids could alternatively be included. Some of these materials contain too great a proportion of water as they are sold to allow of compaction and in these cases the material requires to be dried before mixing with the polymer powder to be compacted. We have found that a water content of over about 10% is excessive for our purposes.

The polymer particles are compacted in the first stage to produce a clear compact at a temperature between 5° C. and 50° C.

It has already been mentioned that it is necessary to remove the charge of static electricity which builds up during the passage of the polymer through the rolls because unless this is done it is found that the sheet tends to disrupt as it leaves the rolls and green compact cannot be formed continuously. This static may be removed by any of the conventional methods. We have found that the inclusion of anionic or cationic ion exchange resins in the polymer composition has the effect of removing the static internally and thus allowing the green compact to be formed without recourse to external means. The inclusion of these resins, apart from this function of removing static charges, has the advantage that the compact if left porous in its final form and sufficient resin has been included can be used for water treatment.

We have found that using either cationic or anionic ion exchange resins as little as 5% total by weight of the polymer will remove static sufficiently for green compacts to be made without employing other means of removing static and, if sufficient is to be included to make the resulting compact useful for water treatment, up to about 50% by weight can be included. These resins do not compact by themselves and a greater proportion than this makes compaction difficult if not impossible.

The rolls which compact the polymers have to be capable of withstanding considerable pressures without distortion; this means that either they must be of sufficient diameter to have the necessary strength for their length or, where a small diameter is desirable, there must be backing rollers to ensure the necessary rigidity to the work rolls. We have found a convenient arrangement using small diameter rolls to be a pair of driven work rolls backed up by a series of friction driven heavy rolls such as are common within the metal-working industry. A number of different arrangements are possible but these systems are well known within the metal-rolling industry and are known generally as "cluster mills."

In order to carry out work of evaluation on polymers we have found it desirable not only to have the gap between the rolls ("the nip") adjustable to different widths but also to be able to alter the angle which the plane through the axis of the work rolls makes to the horizontal. In addition, each work roll and backing roll is fitted with a cleaning pad in contact with the face of the roll to remove surplus powder.

The nature of the green compact produced is not only a function of the characteristics of the powder as has previously been discussed but within wide limits the green compact can be altered even for a given set of characteristics by altering the conditions of the passage of the polymer through the nip.

The two factors altered by the nip are firstly and particularly the density and secondly the thickness of the green compact.

The greater the peripheral speed of the rolls the more open the compact and the lower the speed the denser the compact. This is because the greater the speed the greater the slip between the surface of the rolls and the powder so that although the total throughput may be greater for a high speed the quantity of polymer in proportion is less and vice versa for slower speeds. This assumes, of course, that the nip remains the same but adjustment of the nip gives thinner (and more dense) compact for a narrow gap and thicker (and less dense) compact for a wider gap. It is not convenient to measure the actual pressure generated on the powder in its passage through the nip and this is referred to simply as "pressure setting"—the higher the numbers the greater the gap and consequently the smaller the pressure.

The effect of peripheral speed and pressure setting is shown by the following table obtained using 3 parts by weight of "Vinylite" VYHH (vinyl chloride/vinyl acetate co-polymer) and 1 part of "Corvic" R51/83 (vinyl chloride/vinyl acetate co-polymer) using 4" diameter work rolls at an angle of 30° to the horizontal:

Table 1

| Peripheral Speed, ft./min. | Pressure Setting | Gauge, inch | Density, gms./cm.³ |
| --- | --- | --- | --- |
| 7½ | 55 | 0.0212 | 1.070 |
| 7½ | 65 | 0.0272 | 0.865 |
| 15 | 65 | 0.0252 | 0.830 |
| 7½ | 70 | 0.0310 | 0.820 |

It should also be noted that the surface finish of the rolls is important—a smooth finish will pull in less polymer and result in a less dense compact than will one with a sand blast or rough finish.

In addition, if the plane of the axis of the work rolls is inclined to the horizontal, it is found that, other conditions being constant, the greater the angle to the horizontal the less dense the sheet that results, the limit being reached at the point where the angle to the horizontal is too great to allow of any powder being fed in consistently.

Using the same polymer composition and roll diameter as for Table 1 the following results were obtained with a peripheral speed of 7½ ft. per minute and a pressure setting of 59.

Table 2

| Angle to Horizontal | Gauge | Density |
| --- | --- | --- |
| 30 | 0.0259 | 0.992 |
| 45 | 0.0260 | 0.930 |
| 55 | 0.0247 | 0.920 |

The diameter of the rolls will determine, for any given peripheral speed, the amount of powder being drawn into the nip—the greater the diameter the thicker and denser the green compact. The lower limit is set by what is a practical throughput and the mechanical difficulty of cleaning the rolls. There appears to be no upper limit to the diameter of the rolls because it has been found that whether the rolls are large or small the character of the compact is determined by the peripheral speed of the rolls for any given powder. As the peripheral speed of the rolls increases the density of the compacts falls away and weaker and weaker compacts result. To some extent this weakening can be offset by increasing the nip pressure but this, of course, produces a thinner sheet. Taking all these variables into account we have found that a practical pheripheral speed of the rolls does not exceed 40 ft. per minute. Again using the polymer composition used for Table 1, a pheripheral speed of 15 ft. per minute and an angle to the horizontal of 30° the following results were obtained:

Table 3

| Diameter, inches | Gauge, inch | Density |
| --- | --- | --- |
| 3 | .0187 | .900 |
| 4 | .0246 | .906 |

It is clear from these results that for the same approximate density of compact the larger rolls have pulled in a greater volume of powder than the smaller ones thus giving a thicker green compact.

One of the most striking advantages of our invention is the degree of accuracy and uniformity of gauge which it is possible to achieve. Naturally, as with any mechanism, the engineering accuracy is the ultimate determining factor but within these limits it is possible to work to at least as great a uniformity and consistency of gauge as with a calender.

The following table shows the results obtained on one run using "Vinylite" VYHH alone with 4" diameter work rolls 15" wide, a peripheral speed of 7½ ft. per minute and an angle of 30° to the horizontal:

| Distance along edge | Gauge across 14" width in thousandths of an inch | | |
| --- | --- | --- | --- |
| | Edge | Centre | Edge |
| 0 | 21.5 | 21.1 | 20.2 |
| 6 | 20.7 | 21.2 | 20.2 |
| 12 | 20.1 | 20.6 | 20.6 |
| 18 | 20.5 | 20.6 | 20.8 |
| 24 | 20.8 | 20.9 | 21.6 |
| 30 | 20.7 | 20.6 | 21.2 |
| 36 | 19.8 | 21.2 | 20.5 |

Thus it will be seen that a combination of factors and characteristics must be taken into account both in the choice of polymers which will compact and in the processing conditions to produce a given thickness and density of compact.

The green compact must now be processed further in order to render it usable. The density and to some extent the thickness will have great influence upon the product of the second stage particularly if this product is to remain porous.

Because the green compact is frail it must be conveyed carefully through a heating process. A carrier is best and for this purpose any convenient means may be employed. The heat may be applied by any convenient means but even heating will ensure the best results.

When the green compact is heated it initially swells due to the fact that the polymer softens and the air in its pores expands; further heating then effects a reduction of thickness and an increase in density and eventually if heating is continued for a sufficient period the compact becomes completely non-porous.

It has been found by experience that if a porous material of a given thickness is required it is better to continue the heating past the maximum expansion point and stop it at the required thickness while the compact is collapsing because the mechanical strength of the compact while it is still in the expanding phase is not as great as it is in the contracting phase even although the thickness in both cases is the same.

The length of time and the temperature to which the green compact is heated are interdependent; if the temperature is high then the dwell period within the heating zone can be short and vice versa. The minimum length of time for any given temperature will depend on the thickness of the ingoing green compact and of course the final density required. It should be noted that the higher the temperature to which the compact is heated the more critical is the dwell time as the compact collapses much more quickly than it expands.

Once the compact has passed its maximum expansion point the heating may be stopped at any desired point and this will depend upon what density—and, consequently, porosity— is required.

For electrical storage battery separators, a careful choice of density of green compact and subsequent heating conditions must be made in order to obtain a sintered membrane of satisfactory electrical resistance. By employing a relatively low density green compact, we have found that a sastisfactory membrane can be obtained by heating the compact beyond the maximum swollen stage and stopping at a stage where the sheet is still swollen. By this means, satisfactory electrical resistances can be obtained after the sheet has been wetted out, e.g. by the use of wetting agents. These membranes have adequate strength and may be moulded or embossed to give any required contour without loss of resistance. This is illustrated in the table below for a green compact of gauge 0.0249", density 0.910 gm. per cubic centimetre, made from a mixture of 3 parts by weight "Vinylite" VYHH and 1 part by weight "Corvic" R51/83 heated for different periods in an oven at an ambient air temperature of 145° C.

| Dwell (Minutes) | Gauge Sintered Compact (inch) | Resistance in Battery Acid (Ohms/sq. inch) |
| --- | --- | --- |
| 3½ | 0.0285 | 0.045 |
| 4 | 0.0278 | 0.055 |
| 5 | 0.0265 | 0.115 |

If the heating is carried on until the point where the polymer becomes completely fused it will usually be found that a more or less thin continuous sheet is formed in which are trapped a number of isolated air-bells and these detract from both the appearance and strength of the sheet. If it is desired to produce a bubble-free sheet of good appearance the fused sheet is then pressed in a hot state and this process can be carried out by passing it straight from the oven while it is still hot through a pair of rollers which will flatten it still further and remove air-bells. A flat press can, of course, be used for this purpose and an embossed design can be imparted to the sheet by having one roller or platen of the press suitably treated. In certain cases where the polymer is suitable, for instance if the polymer is polyvinyl chloride or a vinyl co-polymer, the fused sheet can be treated further by subsequent stretching; this operation will decrease the thickness still further and increase the tensile strength—a fact already known to those familiar with the technology of plastic films. We have found, for instance, that by using "Vinylite" VYHH a green compact of 0.014" thick can be made; this is reduced to 0.010" on fusing, is further reduced to 0.005" on pressing and can finally be reduced to 0.002" by stretching.

The end product in view will determine the polymer composition, the thickness and density of the green compact and the conditions of heating used to convert the green compact. If a comparatively thick very porous sintered sheet is the final product required then a thick porous green compact will be sought and this will be heated accordingly but if, on the other hand, a fully fused non-porous sheet is required a fairly thin dense green compact will be made and the heating conditions adjusted to ensure that full fusion takes place with preferably a subsequent pressing and perhaps even stretching operation.

We are aware of British Patent No. 583,148 which claims a method of pressing particles of polytetrafluoroethylene between rollers and subsequent heating to between 327° and 500° C. This material has properties which sets it apart from other so-called plastics, and our invention is not intended to cover it. We therefore disclaim polytetrafluoroethylene from the scope of our invention.

What we claim is:

1. A process for the manufacture of a self-supporting sheet of polymeric material comprising the steps of feeding non-spherical, non-cenospherical, unlubricated particles of a granular polymeric material selected from the group consisting of vinyl chloride polymers prepared by polymerization of vinyl chloride in bulk, vinyl chloride polymers prepared by polymerization of vinyl chloride in solution, vinyl chloride polymers prepared by granular polymerization, methyl methacrylate polymers, urea-formaldehyde resins, phenol-formaldehyde resins and melamine-formaldehyde resins, and having a particle size not greater than that giving a total surface area of 600 sq. cms. per gram of granular resin, into the nip of a pair of rotating rolls, compacting the resin particles between said rolls at a temperature between about 5° C. and 50° C., while removing static electricity from said particles, thereby forming a continuous porous sheet, heating the resulting sheet to increase the strength thereof and terminating said heating before the particles of polymer fuse together sufficiently to destroy the porosity of the sheet.

2. A process for the manufacture of sheet as set forth in claim 1 in which the polymeric material is polyvinylchloride prepared by polymerizing vinyl chloride in bulk.

3. A process for the manufacture of sheet as set forth in claim 1 in which the polymeric material is polyvinylchloride prepared by polymerizing vinyl chloride in solution.

4. A process for the manufacture of sheet as set forth in claim 1 in which the polymeric material is polyvinylchloride prepared by polymerizing vinyl chloride by granular polymerization.

5. A process as claimed in claim 1 wherein the compacted continuous porous sheet has a density of between 0.82 and 1.18 grammes per cubic centimetre.

6. A process as claimed in claim 1 wherein the polymeric material is polymethyl methacrylate.

7. A process as claimed in claim 1 wherein there is added to the polymer powder from 2.5% to 50% of at least one ion exchange resin in powder form selected from the group consisting of an anionic resin and a cationic resin.

8. A process as claimed in claim 1 whereby a fully fused continuous non-porous sheet is produced, said sheet being further mechanically worked.

9. A process as claimed in claim 1 wherein the diameter of the compacting rolls is between 1" and 8".

10. A process as claimed in claim 1 wherein the peripheral speed of the rolls is between 3 feet per minute and 40 feet per minute.

11. A process as claimed in claim 1 wherein the polymeric material is a mixture of polyvinyl chloride and the copolymer of vinyl chloride and vinyl acetate.

References Cited in the file of this patent

UNITED STATES PATENTS

| | | |
| --- | --- | --- |
| 2,573,639 | Coler | Oct. 30, 1951 |
| 2,624,068 | Dobry | Jan. 6, 1953 |
| 2,695,425 | Stott | Nov. 30, 1954 |
| 2,806,256 | Smith-Johannsen | Sept. 17, 1957 |